Patented May 29, 1923.

1,456,667

UNITED STATES PATENT OFFICE.

HOWARD BERRY, OF WELWYN, ENGLAND.

MANUFACTURE OF ARTIFICIAL STONE, CEMENT, OR THE LIKE.

No Drawing.   Application filed February 14, 1923.   Serial No. 619,011.

*To all whom it may concern:*

Be it known that I, HOWARD BERRY, a subject of the King of Great Britain, residing at Welwyn, Hertfordshire, England, have invented certain new and useful Improvements in and Connected with the Manufacture of Artificial Stone, Cement, or the like, of which the following is a specification.

The object of this invention is to provide a cementitious material for use in the manufacture of artificial stone, cement or the like.

According to the invention siliceous matter such as waste slate, coal shale, granite, broken bricks, clinker, slag or any aluminium silicate, or sand, quartz flint or other form of silica brought into a comminuted state by crushing or powdering is mixed with magnesium oxide, and either with tartaric acid, or with the carbonates, bicarbonates and hydrates of sodium, potassium and ammonium, or mixtures of any of these. In some instances about 1% to 2% of soluble silicates such as sodium silicate or potassium silicate may be used in addition to the carbonates, bicarbonates or hydrates, or the finished product may be soaked in a solution of soluble silicate.

When hydrates are used, they are preferably formed into solutions before addition to the other ingredients.

In order to hasten the hardening of the artificial stone or cement, a trace of barium and/or strontium salts with or without ammonium salts such as the chloride, sulphate or phosphate is added to the mixture and a trace of a soluble magnesium salt may be added preferably magnesium sulphate.

As an example, the following proportions may be adopted:

Powdered slate or other basic material as above specified, 85%.
Calcined magnesite or magnesium oxide, 10%.
Sodium bi-carbonate, 5%.
Barium carbonate, oxide, chloride hydrate, or nitrate, a trace say, .5%.

The above materials may be powdered separately, before mixture, but are preferably powdered together. The powdered product is then mixed with water and applied as a cement or plaster, or is moulded.

When magnesium sulphate is added it may form about 1 to 2% of the mixture.

It is preferred to use magnesite which has been burnt or calcined in an atmosphere of steam or water vapour at a low temperature, for instance between 300 to 600° C. Any distillate passing over from the calcining process may be collected and added to the mixture.

The compound may be used for flooring, moulded articles and other purposes. If mixed with asbestos, slag, wool or the like it may be used as an insulating composition for covering boilers, pipes and the like.

I claim:

A cementitious material composed of 85% powdered slate, 10% calcined magnesite, 5% sodium bicarbonate, mixed with a trace of a soluble barium compound, substantially as hereinbefore set forth.

In testimony whereof I have signed my name to this specification.

HOWARD BERRY.